G. O. LEOPOLD.
CLUTCH MECHANISM.
APPLICATION FILED JAN. 11, 1916.

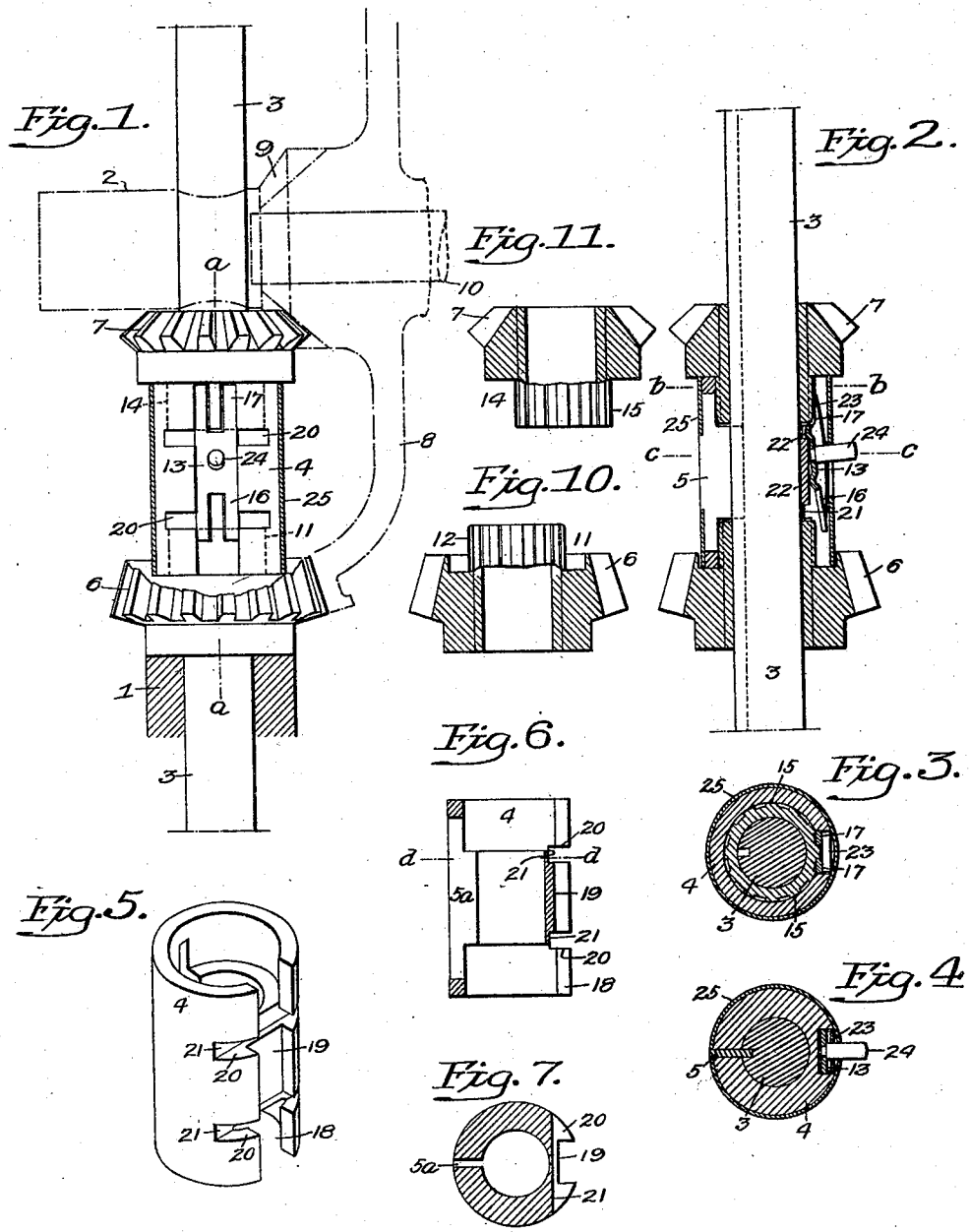

1,188,287.

Patented June 20, 1916.
2 SHEETS—SHEET 2.

Inventor-
George O. Leopold
by his Attorneys
Howson & Howson

UNITED STATES PATENT OFFICE.

GEORGE O. LEOPOLD, OF PHILADELPHIA, PENNSYLVANIA, ASSIGNOR TO NORTH BRO'S. M'F'G CO., OF PHILADELPHIA, PENNSYLVANIA, A CORPORATION OF PENNSYLVANIA.

CLUTCH MECHANISM.

1,188,287.    Specification of Letters Patent.    Patented June 20, 1916.

Application filed January 11, 1916. Serial No. 71,557.

*To all whom it may concern:*

Be it known that I, GEORGE O. LEOPOLD, a citizen of the United States, residing in Philadelphia, Pennsylvania, have invented certain Improvements in Clutch Mechanism, of which the following is a specification.

One object of my invention is to improve the construction of clutch mechanism for locking the gearing to a spindle or shaft so that it will be substantial yet easily operated.

The invention is particularly adapted for use in connection with small drilling machines driven by power or by hand, although it can be applied to other machines where it is desired to drive a spindle or shaft at different speeds.

Figure 12:
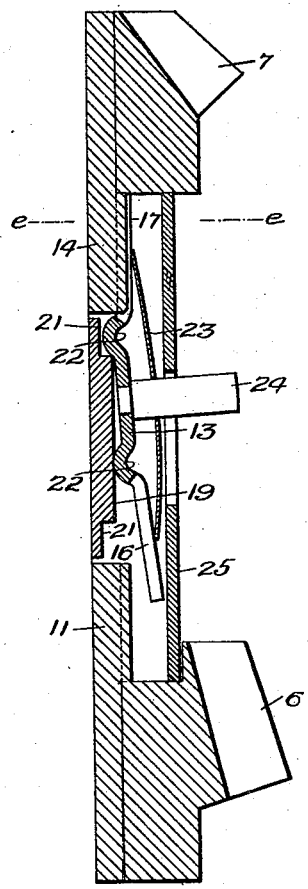
Figure 13:
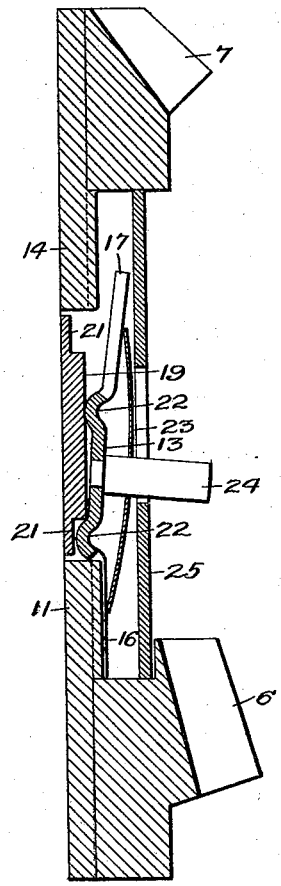
Figure 14:
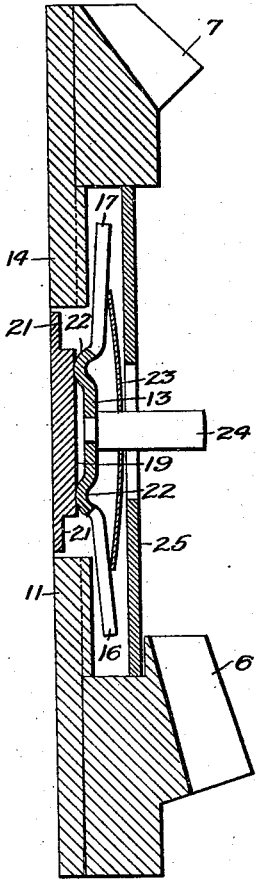
Figure 15:
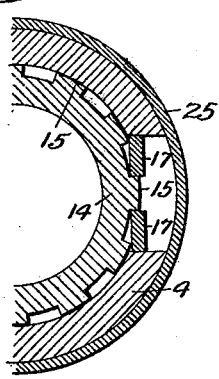
Figure 8:
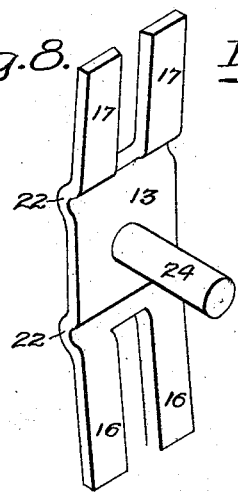
Figure 9:
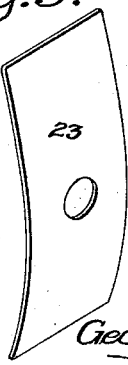

In the accompanying drawings: Figure 1 is a side view of sufficient of a drilling machine to illustrate my invention, the shell inclosing the clutch mechanism being shown in section and the pawl spring being removed; Fig. 2 is a section on the line a—a, Fig. 1; Fig. 3 is a sectional plan view on the line b—b, Fig. 2; Fig. 4 is a sectional view on the line c—c, Fig. 2; Fig. 5 is a detached perspective view of the pawl carrier; Fig. 6 is a longitudinal sectional view of the carrier; Fig. 7 is a sectional view on the line d—d, Fig. 6; Fig. 8 is a detached perspective view of the pawl; Fig. 9 is a detached perspective view of the pawl spring; Fig. 10 is a detached side view, partly in section, of the lower pinion; Fig. 11 is a detached side view, partly in section, of the upper pinion; Figs. 12, 13 and 14, are longitudinal sections showing the pawl shifted to different positions; and Fig. 15 is a section on the line e—e, Fig. 12.

Referring to the drawings, 1 and 2 are bearings forming part of the frame of a drill press in the present instance.

3 is a spindle splined throughout its length and secured to the pawl carrier 4 by a key 5 adapted to a slot 5ᵃ in said carrier so that while the spindle must turn with the carrier it can slide longitudinally therein.

6 and 7 are two beveled pinions, the pinion 6 being greater in diameter than the pinion 7. The pinion 6 meshes with a large bevel gear wheel 8 and the pinion 7 engages with a small bevel gear wheel 9, shown in dotted lines Fig. 1. In the present instances, these two gears 8 and 9 are made, as shown in Figs. 10 and 11. Each wheel has a hub bushing which is driven in the wheel and the projecting portion 11 of the hub bushing of the wheel 6 has a series of teeth 12 thereon and the projecting portion 14 of the wheel 7 has a series of teeth 15 thereon. These wheels are mounted loosely on the spindle 3 between the bearings 1 and 2 and the projecting portions 11 and 14 of the wheels extend into the pawl carrier 4, as clearly shown in Fig. 2. A pawl 13 is mounted in a recess 18 and has fingers 16 at one end adapted to engage the teeth 12 of the wheel 6 and fingers 17 at the opposite end adapted to engage the teeth 15 of the wheel 7. The construction of the pawl is clearly shown in Fig. 8. When the fingers are in engagement they lock the carrier to the pinion. By cutting the carrier away, as at 18, a platform 19 is formed on which the pawl 13 is mounted. Transverse slots 20 are cut in the carrier forming depressed portions 21 at each end of the platform 19. The pawl has projecting ribs 22 at the back which rest on the table when the pawl is in the central position, but, when it is drawn down, one of these ribs drops onto the depressed portion 21, tilting the pawl and causing the fingers 16 to engage the hub 11, locking the pinion 6 to the carrier. At the same time, the fingers 17 are withdrawn clear of the projections on the hub 14 of the pinion 7 so that the carrier and the spindle will be driven through the pinion 6. When the pawl is forced up one of the ribs 22 drops into the upper depression 21, causing the pawl to tip in the opposite directions, the fingers 17 engaging the projections on the hub 14 of the pinion 7, and the finger 16 being withdrawn from engagement with the hub 11. The carrier is thus locked to the pinion 7 and will be driven through said pinion. Back of the pawl is a spring 23, which is perforated for the passage of the knob 24 which extends through a slot in the shell 25 in position to be engaged by the fingers of the operator. The shell extends between the pinions, as shown in Figs. 1 and 2, and protects the pawl and the spring. Thus it will be seen that I provide an exceedingly substantial pawl which is bodily shifted either into engagement with one pinion or the other, or which can be shifted to a central position clear of both pinions. The mechanism can be economically manufactured and it is not liable to get out of order. The pawl fits snugly in the slot 18 so that the side walls of the slot resist any pressure upon the pawls and the pawls are only subjected to a crushing action. They can be made so heavy as to resist this action. By having the two fingers on the pawl engaging a projection on the hub, the hub is locked to the carrier in either direction. By cutting the walls of the projections on radial lines and beveling the edges of the fingers, the fingers extend to the roots of the teeth.

I claim:

1. The combination in clutch mechanism, of a carrier; a spindle, said carrier being slotted; a pawl mounted in the slot and having fingers at each end; a table on the carrier, the pawl being arranged to slide on the table; two hubs, each having projections thereon, one arranged to be engaged by the fingers on one end of the pawl and the other being arranged to be engaged by the fingers on the other end of the pawl; and a spring bearing upon the pawl.

2. The combination in clutch mechanism, of a carrier; a spindle; two pinions, one at one end of the carrier and the other at the opposite end thereof, each pinion having a hub with projections thereon, the carrier having a longitudinal slot therein and forming a central table and having depressed portions at each end of the table; a pawl having fingers at each end; two ribs at the back of the pawl arranged to slide on the table and so positioned in respect to the depressions that when moved to its extreme positions in either direction, one of the ribs will drop into a depression and tilt the pawl, throwing it into engagement with one hub and moving it out of engagement with the other hub.

3. The combination in a drilling machine, of bearings; a spindle mounted in the bearings; a carrier arranged to turn the spindle, said carrier having a longitudinal slot therein forming a central table at the base of the slot and having two transverse slots therein deeper than the longitudinal slot forming depressed portions at each end of the table; two pinions, each having a ribbed hub projecting into the ends of the carrier; a pawl having fingers at each end and two ribs at the back spaced apart so that when the pawl is in the central position both ribs will rest upon the table and the fingers of the pawls will be out of engagement with the hubs of both pinions, but when the pawl is moved into either of its extreme positions, one of the ribs will drop into the depression, tilting the pawl and throwing it into engagement with the ribs on one hub so that the carrier will be locked to the said hub through the pinion, the pinion having a projection; a spring back of the pawl; and a shell inclosing the carrier, pinion and spring.

4. A pawl for a clutch mechanism consisting of a plate having two fingers at each end and two ribs at the back thereof; and having a central projection by which it is shifted.

5. A pawl for a clutch mechanism consisting of a sheet metal plate; two integral fingers at each end arranged at an angle with respect to the body of the plate and having two transverse ribs at the back pressed from the plate at the joint between the fingers and the body of the pawl.

GEORGE O. LEOPOLD.

Copies of this patent may be obtained for five cents each, by addressing the "Commissioner of Patents, Washington, D. C."